United States Patent [19]
Goodrich

[11] 3,774,071
[45] Nov. 20, 1973

[54] HEADLIGHT CONTROL

[76] Inventor: Robert E. Goodrich, 2496 Birch Tree Dr., Germantown, Tenn. 38138

[22] Filed: July 24, 1972

[21] Appl. No.: 274,591

[52] U.S. Cl. .................................................. 315/82
[51] Int. Cl. ............................................. B60q 1/04
[58] Field of Search .............................. 315/82, 83

[56] References Cited
UNITED STATES PATENTS

| | | | |
|---|---|---|---|
| 3,206,637 | 9/1965 | Finken | 315/83 |
| 3,706,006 | 12/1972 | Miller | 315/83 |
| 3,341,736 | 9/1967 | Fortney | 315/82 |
| 3,397,342 | 8/1968 | Dill | 315/83 X |

*Primary Examiner*—Roy Lake
*Assistant Examiner*—James B. Mullins
*Attorney*—Richard S. Shreve, Jr.

[57] ABSTRACT

A vehicle is provided with a relay and circuit for automatically turning on the headlights as soon as the engine is turned on and oil pressure reaches normal operating level or the transmission is automatically shifted into drive and for turning the headlights off when the ignition is turned off or the engine stops.

4 Claims, 3 Drawing Figures

HEADLIGHT CONTROL

FIELD OF THE INVENTION

Over the country, most bus companies provide for burning of headlights at all times on the highway as a safety precaution. A great percentage of daytime (and twilight) accidents are caused by one motorist failing to see another in time. On cloudy days or late in the day or in shadows, a vehicle with headlights burning can be seen and direction determined more than twice as far as without the light. Safety devices now stressed only attempt to protect the driver and passengers in case of an accident — not to prevent an accident.

SUMMARY

In my invention, the headlights of a vehicle are automatically turned on when the vehicle is in operation. To this end, a relay is provided which when energized energizes the headlights even when the main manual head light switch is turned off. An oil pressure switch, closed when the engine attains operating pressure, or the automatic transmission switch, closed when the switch is in drive, will, when closed, complete a circuit to energize the relay and thus turn the headlights on. When the engine stops or the ignition switch is turned off, the relay will be deenergized and the headlights will be turned off.

DETAILED DESCRIPTION OF PREFERRED EMBODIMENTS

Figure 1:
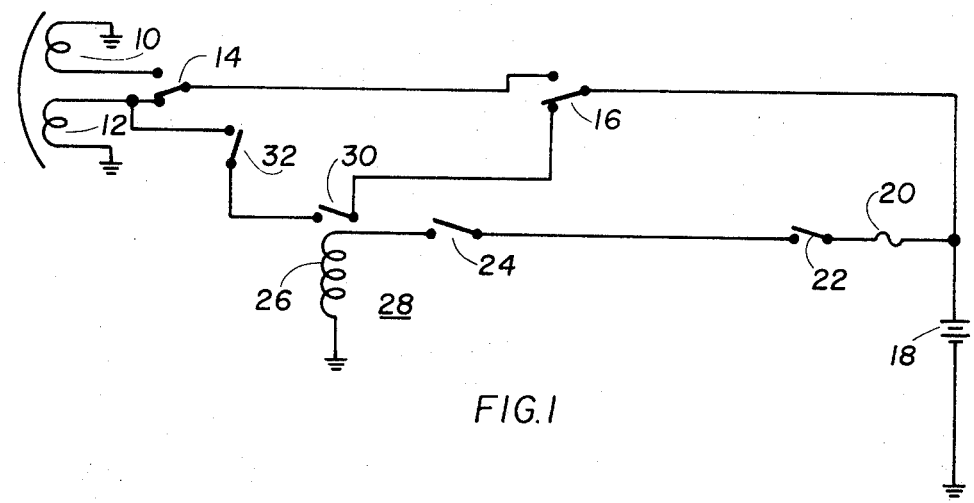
FIG. 1 is a circuit diagram of one form of my invention.
Figure 2:
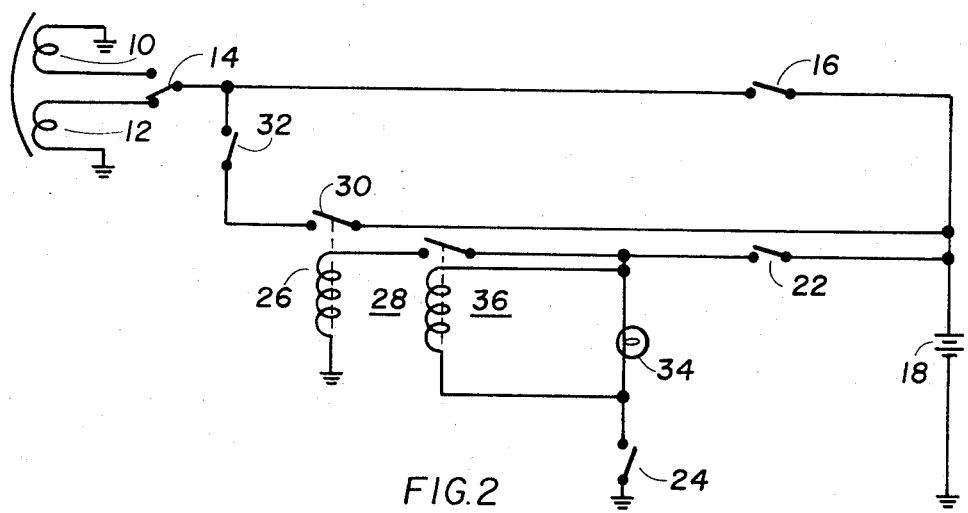
FIG. 2 is a modification thereof.
Figure 3:
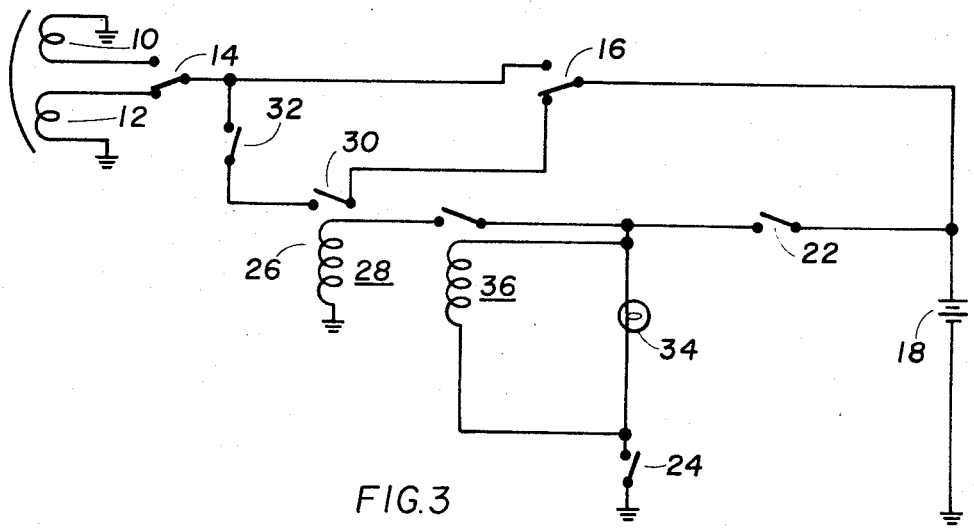
FIG. 3 is another modification thereof.

Referring first to FIG. 1 headlights 10 have high and low beam filaments 10 and 12 with one side grounded. The other side of both filaments are connected to opposite fixed terminals of dimmer switch 14. The arm of dimmer switch 14 is connected to one fixed terminal of headlight switch 16. The arm of this switch is connected to the high voltage side of battery 18. The other side of the battery is grounded.

The high voltage side of the battery is connected to ground via fuse 20, ignition switch 22, oil pressure or transmission position switch 24 and the winding 26 of a relay 28. The other fixed terminal of switch 16 is connected via normally open contacts 30 of the relay and emergency cut off switch 32 to the low beam filament 12.

The circuit to the headlights through the relay is closed when the regular headlight switch is in "off" position. This is necessary so that when the regular headlight switch is in the "on" position, the engine operated circuits are cut off, precluding possibly burning both the high and low beams at one time, (if the dimmer switch is in the high beam position). Of course, this requires the attachment of a separate switch to the regular headlight switch which turns the engine operated circuit "on" when the regular headlight switch is "off."

As an alternate plan, the engine operated circuit can be tapped into the headlight circuit between the dimmer switch and the regular headlight switch and then it would operate whichever beam the dimmer switch was set on. Also, as shown in the drawing, FIG. 1, the device can be operated by position switch as well as oil pressure switch. As can be anticipated, if oil pressure switch is used, as illustrated, it must be a separate switch from the presently used pressure indicators, since oil pressure indicators normally open a circuit in lieu of closing one. The device can be operated by a position switch similar to the presently used "backup" light switch set to the "drive" or high gear position of selector.

Also, the device could be operated successfully by using the present oil pressure indicator lamp 24 adding another relay 36 (or a double purpose relay). FIG. II shows such utilization. It will be noted that with the ignition switch closed, relay 36 is activated to "open" and no circuit is made to coil of relay 28. When engine starts and oil pressure is up, the oil pressure switch is open, breaking circuit to coil of relay 36, sending current to coil of relay 28, turning the headlights on. Of course, with the ignition off no connection is made to either relay, leaving lights off. FIG. III is the same except that the provision of breaking engine operated connections when the regular headlight switch is not in the "off" position has been added.

While I have described my invention with particular reference to the drawings, such is not to be considered as limiting its actual scope.

Having thus described this invention, what is asserted as new is:

1. An automatic headlight control device for use in a vehicle having a battery, headlights, a headlight switch in series with said battery in a first path and having at least a first and second position such that said first position interconnects said headlights to said battery; and an ignition switch in series with said battery in a second path parallel to said first path, comprising:
   a. a main relay having a coil and a normally opened contact element;
   b. first circuit means serially interconnecting said contact element between the second position of said headlight switch and said headlights;
   c. normally open switch means responsive to the operation of the vehicle and closing in response thereto; and
   d. second circuit means serially interconnecting said ignition switch, said switch means and said relay coil to said battery.

2. An automatic headlight control device as in claim 1 wherein said switch means includes an automatic transmission position switch.

3. An automatic headlight control device as in claim 1 wherein said switch means includes an oil pressure switch circuit.

4. An automatic headlight control device as in claim 1 and further comprising headlight selection means serially interconnected in said first path.

* * * * *